(12) United States Patent
Hochwarth et al.

(10) Patent No.: US 8,051,193 B2
(45) Date of Patent: Nov. 1, 2011

(54) COMMUNICATIONS BETWEEN CONTENT AND PRESENTATION PLAYERS

(75) Inventors: Christian Hochwarth, Wiesloch (DE); Sven Bomrich, Rimbach (DE); Andreas S. Krebs, Karlsruhe (DE)

(73) Assignee: SAP AG, Walldorf (DE)

( * ) Notice: Subject to any disclaimer, the term of this patent is extended or adjusted under 35 U.S.C. 154(b) by 325 days.

(21) Appl. No.: 11/558,386

(22) Filed: Nov. 9, 2006

(65) Prior Publication Data

US 2008/0082691 A1 Apr. 3, 2008

Related U.S. Application Data

(60) Provisional application No. 60/827,669, filed on Sep. 29, 2006.

(51) Int. Cl.
*G06F 15/16* (2006.01)
(52) U.S. Cl. ....................................... 709/231
(58) Field of Classification Search ......................... None
See application file for complete search history.

(56) References Cited

U.S. PATENT DOCUMENTS

| | | | |
|---|---|---|---|
| 5,944,787 A | 8/1999 | Zoken | |
| 2003/0157470 A1* | 8/2003 | Altenhofen et al. | 434/350 |
| 2004/0014013 A1* | 1/2004 | Diesel et al. | 434/118 |
| 2004/0107193 A1 | 6/2004 | Tremblay | |
| 2004/0133645 A1 | 7/2004 | Massanelli et al. | |
| 2004/0150662 A1* | 8/2004 | Beigel | 345/707 |
| 2005/0223318 A1* | 10/2005 | Diesel et al. | 715/513 |
| 2006/0234201 A1* | 10/2006 | Pierson et al. | 434/323 |

OTHER PUBLICATIONS

"Sharable Content Object Reference Model (SCORM)® 2004 3$^{rd}$ Edition" Overview Version 1.0 DRAFT, © 2006 Advanced Distributed Learning, Aug. 18, 2006.
"Content Aggregation Model (CAM) SCORM® 3$^{rd}$ Edition", Version 1.0—DRAFT, © 2006 Advanced Distributed Learning, Aug. 18, 2006.
"Run-Time Environment (RTE) SCORM® 2004 3$^{rd}$ Edition", Version 1.0 —Draft © 2006 Advanced Distributed Learning, Aug. 18, 2006.
"Sequencing and Navigation (SN) SCORM® 3$^{rd}$ Edition", Version 1.0—Draft © 3002 Advanced Distributed Learning, Aug. 18, 2006.
Advanced Distributed Learning™; Advanced Distributed Learning Initiative, "*Sharable Content Object Reference Model (SCORM™), Version 1.2; The SCORM Run-Time Environment*, Oct. 1, 2001," (http://www.adlnet.org/), 2001, 85 pages.
Cardoza, Patricia. Special Edition Using Microsoft Office Outlook 2003. Que, Sep. 25, 2003, 31 pages.

(Continued)

*Primary Examiner* — Ario Etienne
*Assistant Examiner* — Clayton R Williams
(74) *Attorney, Agent, or Firm* — Fish & Richardson P.C.

(57) ABSTRACT

Systems and techniques by which content and presentation players can communicate are described. In one aspect, presentation system for rendering a presentation for a user includes one or more output devices, a presentation including machine-readable descriptions of content and a service request triggering mechanism to trigger a service request, and a presentation player configured to generate a rendition of the presentation at one or more output devices and to respond to the service request with a service response to populate the rendition of the presentation. The service response includes at least one of information characterizing an arrangement of content in the presentation and information characterizing prior navigation of the user through the content of the presentation. The presentation further includes extraction logic to extract relevant information from a response to the service request for addition to the rendition of the presentation.

33 Claims, 4 Drawing Sheets

OTHER PUBLICATIONS http://msdn.microsoft.com/library/en-us/e2k3/e2k3/_techsel_tech_13.asp?frame=true, "Messaging Application Programming Interface (MAPI)," 2 pages, printed from the internet on Apr. 8, 2004.

The Windows Interface Guidelines for Software Design, "Direct Manipulation Method," pp. 77-87.

Drag-and-Drop, Part IV: The Interaction, pp. 247-267.

* cited by examiner

COMMUNICATIONS BETWEEN CONTENT AND PRESENTATION PLAYERS

CROSS-REFERENCE TO RELATED APPLICATIONS

This application claims the priority of U.S. Provisional Application Ser. No. 60/827,669, filed Sep. 29, 2006, the contents of which are incorporated herein by reference.

BACKGROUND

This disclosure relates to communications between content and presentation players in a data processing environment.

Content is the matter treated in a work. In the context of digital works such as a web page or other digital document, content can include text, sound, images, and video components, as well as interactive components such as scroll bars, buttons, and other widgets that allow a human user to navigate through the content. Content can also include interactive and dynamic elements, such as animations provided by the ADOBE FLASH format (Adobe Systems Incorporated, San Jose, Calif.)

A presentation player is a set of data processing activities performed in accordance with the logic of a set of machine-readable instructions to render content for a human user. The rendition can include, e.g., visual, audio, and/or mechanical aspects. Content thus can be rendered using any of a variety of output devices including visual displays (such as monitors, display screens, and the like), audio devices (such as speakers and the like), and/or mechanical devices (such as Braille outputs and the like).

One example of the use of presentation players is in a Learning Management System. A Learning Management System is a set of data processing activities performed in accordance with the logic of a set of machine-readable instructions to implement and/or assess learning or other educational processes. In general, a learning management system can facilitate delivery of educational content, the monitoring of student participation, and the assessment of student performance. In some implementations, a learning management system can provide features by which instructors can develop content and students can interact with each other and/or with an instructor. Such interactive features can include threaded discussions, video conferencing, discussion forums, and the like. The Advanced Distance Learning (ADL) group has created a set of specifications called Shareable Content Object Reference Model (SCORM) to encourage the standardization of learning management systems.

SUMMARY

Systems and techniques by which content and presentation players can communicate in a data processing environment are described.

In one aspect, a method includes rendering a content node in a collection of content nodes for a user, receiving the service request as a consequence of the triggering of the service request by the service request mechanism, performing data processing activities to generate information responsive to the service request, returning the responsive information to the presentation, and updating the rendition of the content node to reflect at least some of the responsive information. The content node includes a service request mechanism that triggers a service request. The responsive information characterizes the disposition of the content node in the collection of content nodes.

This and other aspects can include one or more of the following features. The service request mechanism can be a widget to interact with the user and thereby receive a user selection triggering the service request.

The rendition of the content node can be updated by adding the responsive information to a framework included in the content node. The rendition of the content node can be updated by rendering a table of contents of the collection of content nodes and/or by rendering a collection of content node identifiers arranged to reflect the structure of the collection of content nodes. A table of contents can be rendered with an indicium to reflect the navigation of a user through the collection of content nodes. The indicium can reflect the user having previously completed an assessment node of the collection of content nodes. An indicium can also reflect an attribute of a constituent content node of the collection of content nodes.

In another aspect, a method includes receiving a presentation that includes a collection of content nodes, interacting with a user to navigate through a rendition of at least some of the content nodes of the presentation, maintaining a historical record of the navigation of the user through content nodes of the presentation, receiving a request from the presentation, returning a response describing the historical record of the navigation to the presentation, and rendering the presentation to include one or more indicia indicative of the prior navigation of the user through content nodes of the presentation.

This and other aspects can include one or more of the following features. The table of contents can be rendered with an indicium indicating that the user had previously completed an assessment content node in the presentation, with an indicium indicating that the user had previously visited a content node in the presentation, and/or with an indicium indicating a currently-rendered content node in the presentation.

The method can also include calling a function to generate the response to the request to generate the table of contents and/or returning the response to the request to generate the table of contents to the presentation. The request can be received the request as a consequence of user interaction with a widget in the presentation.

In another aspect, a presentation system for rendering a presentation for a user includes one or more output devices, a presentation including machine-readable descriptions of content and a service request triggering mechanism to trigger a service request, and a presentation player configured to generate a rendition of the presentation at one or more output devices and to respond to the service request with a service response to populate the rendition of the presentation. The service response includes at least one of information characterizing an arrangement of content in the presentation and information characterizing prior navigation of the user through the content of the presentation. The presentation further includes extraction logic to extract relevant information from a response to the service request for addition to the rendition of the presentation.

This or other aspects can include one or more of the following features. The presentation can be configured to add the relevant information extracted from the response to the service request to the rendition of the presentation. The presentation player can include an application program interface to receive and respond to the service request. The presentation player can be configured to respond to the service request with the service response in XML format. The presentation player can be configured to respond to the service request with the service response including information describing a hierarchical arrangement of content nodes in the presentation. The service request triggering mechanism can be a request widget to interact with the user and thereby receive a user selection triggering a service request. The service request triggering mechanism can also be an automatic mechanism that is triggered without user input in response to the rendition of the presentation.

The details of one or more implementations are set forth in the accompanying drawing and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
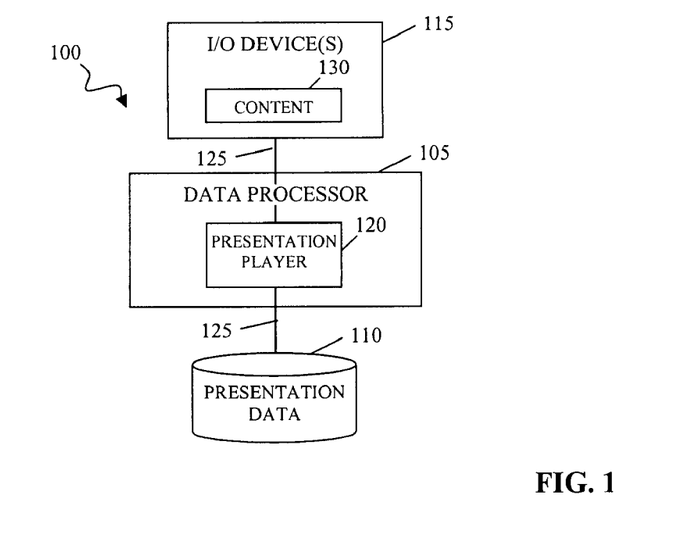
FIG. 1 is a schematic representation of a presentation system.

FIG. 1 is a schematic representation of a presentation system 100. Presentation system 100 includes one or more data processors 105, one or more data storage devices 110 that store presentation data, and one or more input/output devices 115. Data processor 105 can be a data processing device and/or software that performs processing activities in accordance with the logic of a set of machine readable instructions. For example, data processor 105 can perform processing activities that result in a presentation player 120. Presentation player 120 can receive and interpret content from one or more data storage devices 110 to create instructions for rendering the content to a user on one or more input/output devices 115. The machine readable instructions used to generate presentation player 120 can be compiled or uncompiled computer code and can be implemented in a high-level procedural and/or object-oriented programming language, and/or in assembly/machine language.

In some implementations, the data processing activities of presentation player 120 can be performed by one or more data processing devices. For example, presentation player 120 can include a server set of data processing activities (i.e., a "server component") and a client set of data processing activities (i.e., a "client component") that exchange information in accordance with one or more data communication protocols. Data processing activities for the server component can be performed at an application or other server. Data processing activities for the client component can be performed at a front end or other client.

In some implementations, during operation, a human user can initially interact with a server component using, e.g., a browser. A client component can be downloaded into the browser and interact with the user during a subsequent rendition of content. Such a client component can provide an application program interface to the content and communicate with the server component as needed (through function calls or otherwise), as discussed further below. For example, presentation player 120 can be the content player of the SAP LEARNING SOLUTION (SAP AG, Walldorf, Germany).

Data storage device 110 can store a library of content. Data storage device 110 can be a local storage device (such as, e.g., a hard drive or a CD associated with a computer) or a remote storage device that is associated with another data processing device. Data storage device 110 can be, e.g., a file system, a database, a web server, or the like.

The content stored on data storage device 110 can be organized into presentations. A presentation is a collection of related content nodes that generally share common distinguishing characteristics. For example, courses and/or lessons in a Learning Management System are presentations that are generally adapted to educate students about a subject. The content nodes of a course can, e.g., each address a particular topic or section of a subject covered by a presentation, be designed to test students about the subject, or otherwise be related to the subject. The scope and duration of a content node can vary. For example, a first content node may provide basic information regarding a broad scope of the subject matter being presented, and a second content node may provide more detailed information regarding a narrow scope of the subject matter. Content nodes that provide different levels of detail can be denoted as belonging to classes or categories that describe the level of detail provided. For example, a course content node can provide less detail than a lesson content node. The nature of a content node can vary depending on the type of content. For example content nodes can be text slides, streaming video elements, narrative audio files, and the like.

Content nodes can be organized in a presentation in accordance with the wishes of an instructor or other presentation designer. For example, such a user can select content nodes for inclusion in a presentation, a sequence of the selected content nodes, and an organizational arrangement of the selected content nodes in a presentation structure. For example, in a presentation organized in a linear fashion, the user can arrange content nodes that instruct students about a subject before content nodes that assess students as to their understanding of the subject. As another example, in a presentation organized in a hierarchical structure, a content node with a relatively narrow or detailed topic scope can serve is a child sub-node of a content node with a broader or less detailed scope.

Input/output devices 115 can provide for interaction with a user. Input/output devices 115 can render a presentation for the user, e.g., by playing audio content and/or displaying video, graphic, or text content. Input/output devices 135 can include a visual display device (such as a cathode ray tube or liquid crystal display monitor), a sound-generating device (such as a speaker), a keyboard, and/or a pointing device such as a mouse or a trackball.

Data is communicated within presentation system 100 over a collection of one or more data link 125 even if data processors 105, data storage devices 110, and input/output devices 115 are physically discrete devices that are remote from one another and/or operated by separate entities. For example, data link 125 can allow a presentation to be communicated from a data storage device 110 of a vendor who produces presentations to input/output devices 115 of a subscriber who has purchased the right to access the communicated presentation. As another example, data link 125 may allow presentations from multiple data storage devices 110 to be accessed remotely. Data link 125 can be any data communication channel, such as the Internet, a LAN, a WAN, a wireless network, and the like.

Figure 2:
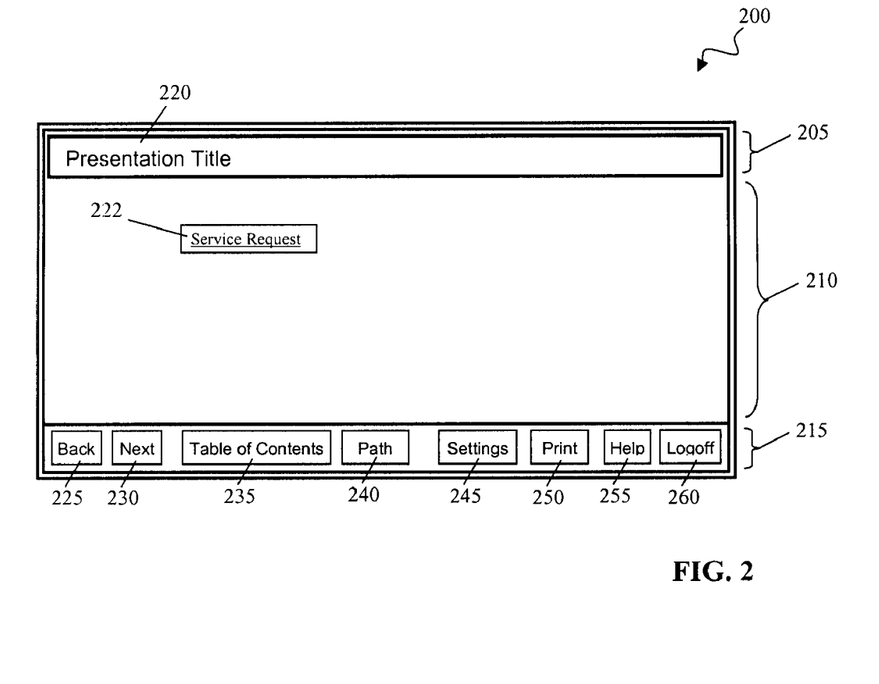
FIG. 2 is a representation of a graphic display that can be created by a presentation player to render content.

FIG. 2 is a representation of a graphic display 200 that can be created by presentation player 120 of presentation system 100 (FIG. 1) to render content. Graphic display 200 can be, e.g., a browser window and includes a header 205, content rendition area 210, and a navigation bar 215. Header 205 can include a title 220 and/or other information relevant to a presentation that is currently being rendered.

Content rendition area 210 can be used to render content drawn from one or more content nodes of a presentation for a user. The rendition of content in content rendition area 210 can invoke one or more mechanisms by which a service request is triggered. The triggering of a service request can be automatic and performed without involvement of a human user or the triggering of a service request can require action by a human user. For example, the rendition of content in content rendition area 210 can create a one or more service request widgets 222 for interaction with a human user to trigger a service request.

Navigation bar 215 includes buttons, scrollbars, or other widgets that interact with a user to allow the user to control the rendition of content in rendition area 210. For example, navigation bar 215 can include a back button 225, a forward button 230, a table of contents button 235, a path button 240, a settings button 245, a print button 250, a help button 255, and a logoff button 260. Back button 225 can receive a user selection to render content that had previously been rendered. The previously-rendered content can be, e.g., a previously-viewed content node. Forward button 230 can receive a user selection to render content that sequentially follows the content currently rendered in content rendition area 210. For example, the sequentially-following content can be the next content page in a presentation of content pages. Table of contents button 235 can receive a user selection to render a table of contents of a presentation currently being rendered in content rendition area 210, as discussed further below. Path button 240 can receive a user selection to render a representation of the user's path through the presentation currently being rendered in content rendition area 210. Settings button 245 can receive a user selection to render a description of the current settings for the rendition of content in content rendition area 210. Print button 250 can receive a user selection to print the content rendered in content rendition area 210. Help button 255 can receive a user section to render advice (such as a help screen) regarding the rendition of content in content rendition area 210.

Other navigation bars 215 can include other widgets that interact with a user to allow the user to control the rendition of content in rendition area 210 in other ways. For example, when rendering hierarchically-structured presentations, navigation bar 215 can include widgets that allow a user to move up or down in the hierarchical structure.

With prior presentation players, the displays of content rendition area 210 and navigation bar 215 were independent. In particular, the content rendered in content rendition area 210 was unaware of its disposition in a collection of content and the historical record of a user's navigation through the content. In the context of a presentation, each individual content node lacked information regarding the disposition of that node in the presentation and the historical record of a user's navigation through the presentation. In the context of the Shareable Content Object Reference Model, each Shareable Content Object each object had to be self-contained and therefore lacked information regarding the disposition of that Shareable Content Object in the model and the historical record of a user's navigation through the model.

This independence and lack of information limited the types of content that could be displayed in content rendition area 210 or otherwise used by the rendered content. For example, content rendition area 210 could not include information regarding the progress or path of a user through the content since this information was only available to the presentation player but not to content. As another example, content rendition area 210 could not include information regarding the disposition of a current content node in a presentation. As yet another example, the display in content rendition area 210 could not be tailored based on the progress or path of a user through the content. This could be useful. e.g., in learning management systems where the type of questions presented during an assessment could change with the path of a user. Moreover, with prior presentation players, there was no communication between the presentation player and the content that would allow such limits to be overcome.

Figure 3:
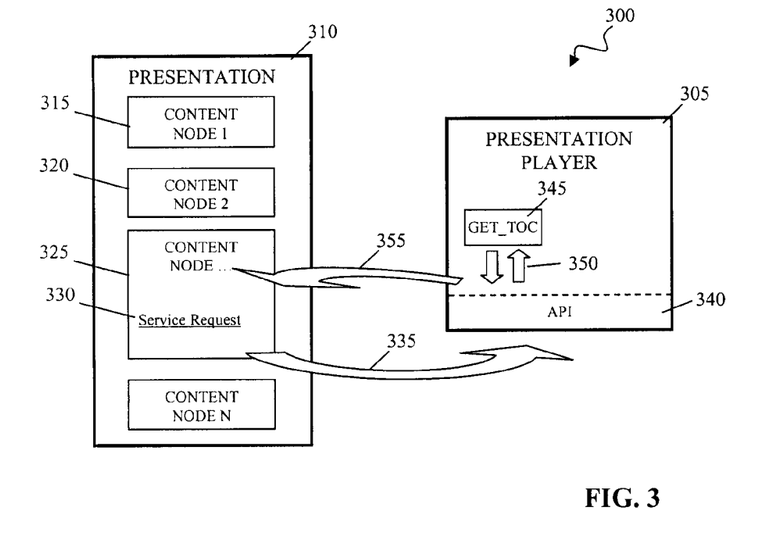
FIG. 3 illustrates one implementation of a communication process between a presentation player and a presentation.

FIG. 3 illustrates one implementation of a communication process 300 between a presentation player 305 and a presentation 310 that is being rendered by presentation player 305. Communication process 300 can involve the performance of one or more data processing activities by presentation player 305 in order to populate the rendition of a presentation 310. As discussed further below, in some implementations, additional content can be rendered in presentation 310 on the behest of presentation 310 and/or the type of content rendered can be tailored in accordance with factors such as a user's navigation history through presentation 310. Additional content can also reflect, e.g., the prior navigation of a user through a presentation, the disposition of a content node in a presentation, or the like.

As illustrated, process 300 begins with presentation player 305 rendering zero or more content nodes 315, 320 of presentation 310. At some point, a content node 325 is reached. Content node 325 includes a service request 330 that is configured to request a service from presentation player 305. Service request 330 can be activated automatically (e.g., whenever content node 325 is rendered) or service request 330 can be activated in response to selection by a user. For example, service request 330 can be activated by user interaction with a service request widget in content node 325 itself, i.e., in content rendition area 210. In some implementations, service request 330 can include information specifying which particular service is to be rendered by presentation player 305, along with an identifier of presentation 310, such as the Uniform Resource Locator (URL) of presentation 310. Multiple content nodes in presentation 310 can include a service request such as service request 330. Also, a single content node in presentation 310 can include multiple service requests.

Once service request 330 is activated, a service request message 335 is conveyed to presentation player 305. Presentation player 305 can include an application program interface (API) 340 that can receive and respond to service request message 335. An application program interface (API) is an interface that is provided by an application such as presentation player 305 to accommodate service requests. An API can include a set of definitions of elements used to accommodate service requests. For example, functions, procedures, subroutines, variables, data structures, and/or class descriptions (hereinafter "functions") can be defined to provide access to the data processing activities of presentation player 305. API 340 can be, e.g., a SCORM API, such as described in section 3.3.6.1 of the SCORM 1.2 Runtime Environment.

The specific data processing activities in presentation player 305 accessed by content node 325 can depend on the function specified by service request message 335. For example, as illustrated, presentation player 305 can include a "GET_TOC" function 345. "GET_TOC" function 345 is a set of data processing activities designed to provide information regarding the table of contents of presentation 310 and/or the user's navigation through presentation 310. If service request message 335 specifies "GET_TOC" function 345, API 340 calls "GET_TOC" function 345 with information identifying the currently rendered presentation. API 340 also receives the information generated by "GET_TOC" function 345 in response, as illustrated by arrows 350.

A variety of different functions can be called by API 340 in response to different service requests 335. For example, a GET_PATH function can be called to generate information regarding a user's path through a presentation. Other functions can be called to determine, e.g., the progress of a user through a presentation, the rate of a user's progress through a presentation, and the like.

API 340 can format the information generated by "GET_TOC" function 345 (or any other function) and return a service response 355 to content node 325. The contents of service response 355 can be used to populate the rendition of content node 325. In this regard the rendition of content node 325 can include data processing activities that populate content node 325 with the contents of service response 355. For example, content node 325 can include dynamic elements or other intelligence that extracts information from service response 355. The extracted information can reflect the activities performed in the rendition of content node 325 and can be added to a framework or other mechanism for rendition along with other elements of content node 325. The tailored and/or additional content, along with other aspects of content node 325, can then be rendered for a user by presentation player 305.

Although the contents of service response 355 are used to populate the rendition of content node 325, these contents need not be stored with content node 325 in a data storage device such as data storage device 110. Rather, the contents of service response 355 can be added to a display framework of content node 325 for rendition and then discarded after use, such as after the next content node is rendered. If content node 325 is rendered again, a new service request can be made. The new rendition of content node 325 can reflect response to the new service request.

As discussed above, in some implementations, the data processing activities of a presentation player, such as presentation player 305, can be performed by one or more data processing devices. Service request message 335, service response 355, and/or arrows 350 can thus involve data communication between remote data processing devices. For example, service request message 335 can directly call "GET_TOC" function 345 at a remote application server from content node 325. As another example, API 240 can be provided by a set of data processing activities performed by a client and "GET_TOC" function 345 can be performed at a server. Service request message 335 can thus involve local data communications in a client, whereas arrows 350 can involve data communication with a remote server that performs "GET_TOC" function 345.

Figure 4:
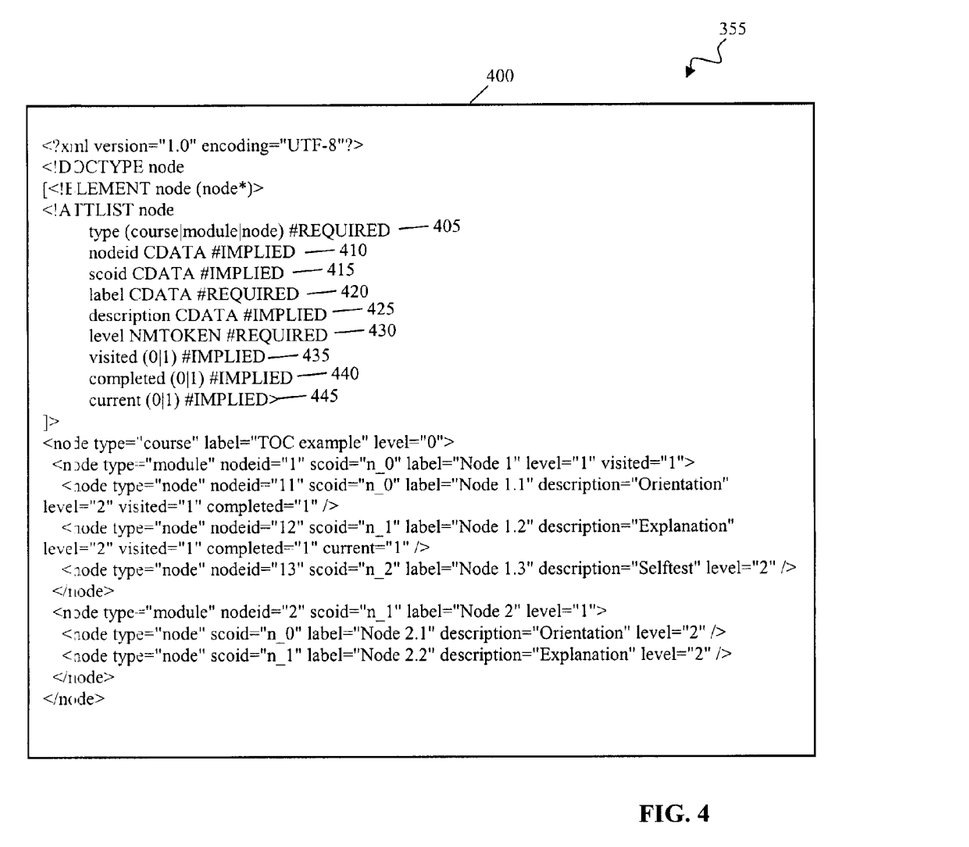
FIG. 4 is a representation of a response that can be returned from a presentation player to a presentation.

FIG. 4 is a schematic representation of a service response 355 that can be returned from API 340 to content node 325 to populate the rendition of content node 325 (FIG. 3). Service response 355 describes the hierarchical arrangement of content nodes in a presentation that is being rendered during the runtime of "GET_TOC" function 345.

The illustrated service response 355 is an XML file 400. XML file 400 can include a description of the hierarchical structure of a presentation, along with a description of the constituent content nodes of the presentation. The description of the constituent content nodes can include information regarding the user's navigation through presentation 310. For example, XML file 400 specifies that a type attribute 405, a NodeID attribute 410, a SCOID attribute 415, a label attribute 420, a description attribute 425, a level attribute 430, a visited attribute 435, a completed attribute 440, and a current attribute 445 be returned for each content node of a presentation. Type attribute 405 can describe the category of a content node, e.g., a course content node, a lesson content node, a module content node, a node content node, or the like. NodeID attribute 410 can unambiguously identify a content node for use, e.g., in navigating to the content node. SCOID attribute 415 can unambiguously identify a corresponding shareable content object in a manifest such as an imsmanifest.xml file. If the presentation is not a SCORM course, SCOID attribute 415 can include another identifiers, such as one based on the sequential numbering of the content node in the corresponding learning net or learning object. Label attribute 420 generally provides a short name or title of a content node that is tailored to be understood by humans and that can be used in rendering the node. Description attribute 425 can provide more detailed information regarding a content node in a form that is tailored to be understood by humans and that can be used in rendering the node. In the context of Learning Management Systems, description attribute 425 can describe the purpose of a content node as, e.g., an "overview" content node, a "definition" content node, an "assessment" content node, or the like. Level attribute 430 can describe the hierarchical level of a content node within a hierarchical presentation. Visited attribute 435 can be a flag or other information that describes whether a content node has already been opened by a user. Completed attribute 440 can be a flag or other information that describes whether a content node has already been completed by a user. Current attribute 445 can be a flag or other information that describes whether a content node is currently being rendered.

Various approaches can be used by data processing activities such as "GET_TOC" function 345 to populate the values associated with attributes 405, 410, 415, 420, 425, 430, 435, 440, 445 in XML file 400. For example, some attributes can be copied and/or derived from presentation 310 itself. Other attributes can be determined from a historical record of a user's navigation through presentation 310 or through other means. By way of example, in one implementation, type attribute 405, SCOID attribute 415, label attribute 420, and description attribute 425 can be copied from corresponding fields of content nodes in presentation 310. Level attribute 430 can be derived from the arrangement of content nodes in presentation 310. NodeID attribute 410 can be derived by creating a new unique node ID each time a new rendition of presentation 310 is generated by the presentation player. Please note that since such a node ID is created for each rendition, such a node ID cannot be hard coded into presentation 310. Visited attribute 435 and completed attribute 440 can be determined from a historical record of a user's navigation through presentation 310. Current attribute 445 can be determined from such a historical record or even set to a default value when only a single content node is capable of requesting a service from API 340.

Figure 5:
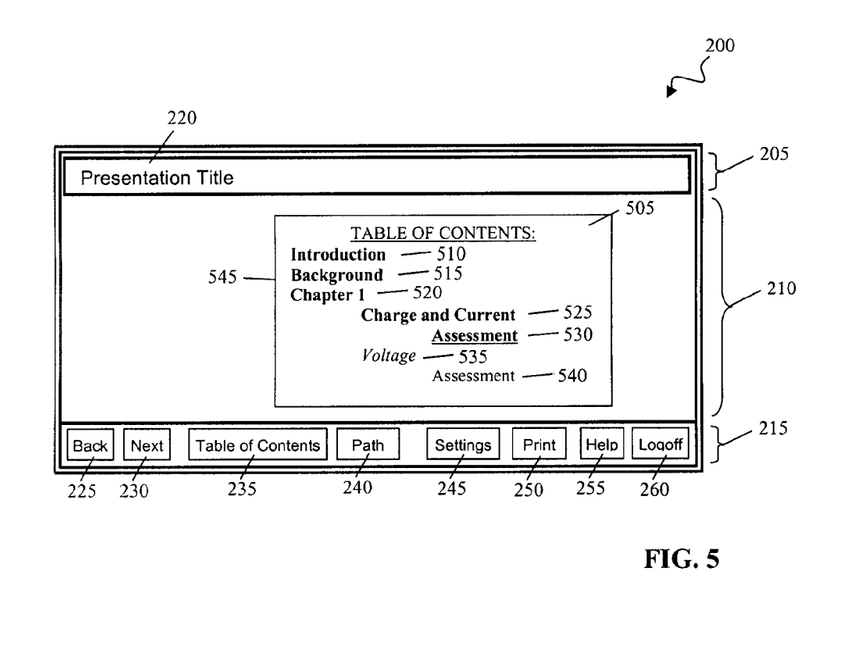
FIGS. 5 and 6 are representations of the graphic display of FIG. 2 as it renders content that has been added to a presentation by the presentation player.

FIG. 5 is a representation of graphic display 200 as it renders content that has been added by the content. In particular, content rendition area 210 renders a table of contents 505 that includes the contents of a service response that has been received from a presentation player.

Table of contents 505 includes an ordered collection of content node identifiers 510, 515, 520, 525, 530, 535, 540 arranged to reflect the structure of the current presentation identified by title 220. For example, as shown, content node identifiers 510, 515, 520, 525, 530, 535, 540 can be tabbed or otherwise displaced from a border 545 to describe the hierarchical arrangement of the corresponding content nodes in the presentation. Other indicia can be used to reflect the navigation of a user through a presentation. For example, previously visited content nodes can be rendered in boldface type, as shown for content node identifiers 510, 515, 520, 525, 530. Completed content nodes can be underlined, as shown for content node identifier 530. A current content node can be rendered in italicized type, as shown for content node identifier 535.

Other indicia can be associated with content node identifiers 510, 515, 520, 525, 530, 535, 540 to reflect other attributes of the identified content nodes. For example, content node identifiers 510, 515, 520, 525, 530, 535, 540 that identify assessment content nodes can be rendered adjacent to a visual representation of a pen and paper. Timed content nodes can be rendered adjacent to a visual representation of a clock. The type of a content node can be indicated, e.g., by the font size or other indicator.

Table of contents 505 can thus be rendered in the same window as other content in content rendition area 210. However, this is not necessarily the case and in some implementations, table of contents 505 can be rendered by presentation player in one or more windows in content rendition area 210 that are visible in parallel with other content. Such a table of contents 505 can be updated independently and/or in sync with such other content.

Regardless of whether it is rendered in the same or a different window, since table of contents 505 is rendered by the content (as opposed to the presentation player), table of contents 505 can be rendered using a technology and a format that is appropriate for that other content. For example, the size and font of table of contents 505 can be matched to the size and font of other content in content rendition area 210 and the appearance and readability of table of contents 505 improved. In other words, different presentations and/or different content nodes can render table of contents 505 using different visual characteristics.

Figure 6:
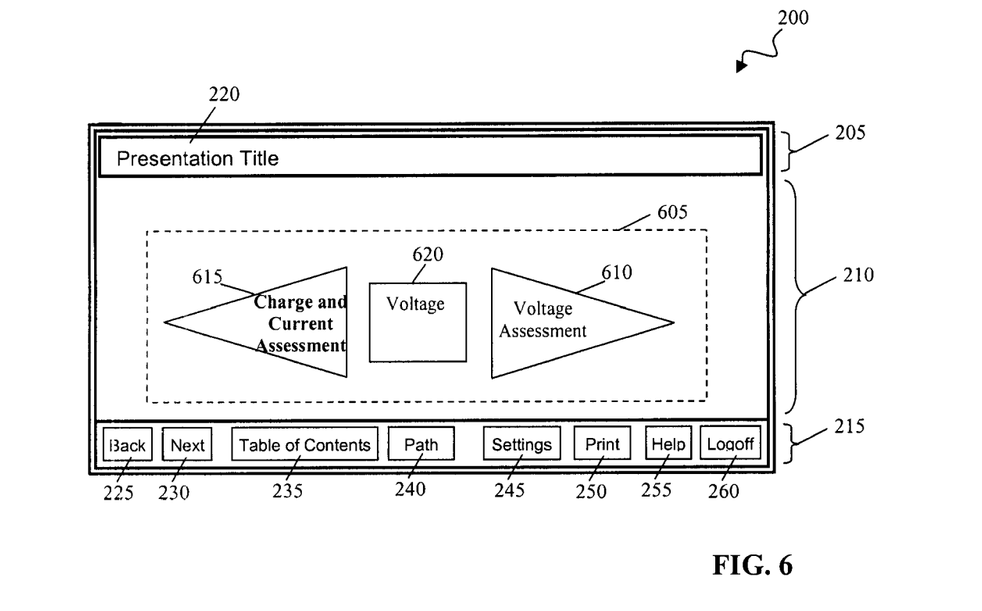

FIG. 6 is a representation of graphic display 200 as it renders content that has been added by the content. In particular, content rendition area 210 renders a navigation bar 605 that includes the contents of a service response that has been received from a presentation player.

Navigation bar 605 includes a forward widget 610, a back widget 615, and a current widget 620. Forward widget 610 includes text or other information identifying the next content node in a presentation. Back widget 615 includes text or other information identifying the previous content node in a presentation. Current widget 620 includes text or other information identifying the currently rendered content node in a presentation.

Forward widget 610, back widget 615, and current widget 620 are not predefined elements but rather reflect the information received in a the service response. In particular, navigation bar 605 displays information describing the disposition of the currently rendered content node in a presentation as part of the rendered content itself, in contrast with the presentation player navigation that displays such information outside of the content. One or more visual indicia can be associated with forward widget 610, back widget 615, and current widget 620 to describe the history of a user's navigation through the presentation. For example, the identifying text in back widget 615 can be presented in boldface type to indicate that the user had previously visited the previous content node.

Thus, content and presentation players can communicate in a data processing environment. The communication can be used to populate the rendition of a presentation with information relating to the disposition of the content in a collection of content or a historical record of a user's navigation through the content.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) (or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing environment that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the environment can be interconnected by any form or medium of digital data communication (e.g., a communication network). Examples of communication networks include a local area network ("LAN"), a wide area network ("WAN"), and the Internet.

A number of implementations have been described. Nevertheless, it will be understood that various modifications may be made. For example, a presentation player can include additional elements such as a web/network server, reporting and tracking data storage and management capabilities, and/or a registration system for registering users (such as students and instructors). Different attributes of a presentation, or a user's navigation through a presentation, can be communicated. Accordingly, other implementations are within the scope of the following claims.

What is claimed is:

1. A method using a presentation player comprising a server component and a client component, the method comprising:
   the client component of the presentation player rendering, on an display device,
      a rendition of content drawn from a first content node of a collection of content nodes in a content rendition area of a presentation, the content rendition area including a service request mechanism that triggers a service request;
   the presentation player receiving the service request as a consequence of a triggering of the service request with the service request mechanism included in the content rendition area;
   the server component of the presentation player performing data processing activities to generate information responsive to the service request, the responsive information characterizing the disposition of the first content node in the collection of content nodes; and
   the client component of the presentation player updating the rendition of the first content node in the content rendition area on the display device to reflect at least some of the responsive information,
   wherein the presentation player is a set of data processing activities performed in accordance with the logic of a set of machine-readable instructions to render content for the user, the presentation player comprising the server component performed at a server data processing device and the client component performed at a client data processing device, the server component and the client component exchanging information in accordance with one or more data communication protocols.

2. The method of claim 1, wherein the service request mechanism that triggers a service request comprises a widget to interact with the user and thereby receive a user selection triggering the service request.

3. The method of claim 1, wherein updating the content rendition area comprises adding the responsive information to a framework included in the first content node.

4. The method of claim 1, wherein updating the content rendition area comprises tailoring the content rendition area in light of the responsive information.

5. The method of claim 1, wherein updating the content rendition area comprises rendering a table of contents of the collection of content nodes in the content rendition area.

6. The method of claim 5, wherein rendering the table of contents comprises rendering a collection of content node identifiers arranged in the content rendition area to reflect the structure of the collection of content nodes.

7. The method of claim 5, wherein rendering the table of contents comprises rendering an indicium in the content rendition area to reflect the navigation of the user through the collection of content nodes.

8. The method of claim 7, wherein rendering the indicium comprises rendering the indicium to reflect the user having previously completed an assessment node of the collection of content nodes.

9. The method of claim 5, wherein rendering the table of contents comprises rendering an indicium in the content rendition area to reflect an attribute of a constituent content node of the collection of content nodes.

10. The method of claim 1, wherein the client component of the presentation player comprises an application program interface, the application program interface receiving the service request.

11. The method of claim 10, further comprising the application program interface calling a function for performing the data processing activities at the server component to generate the information responsive to the service request.

12. The method of claim 1, wherein the first content node comprises a self-contained shareable content object that lacks information regarding its disposition in the collection of content nodes.

13. The method of claim 1, wherein the first of the content nodes comprises a self-contained shareable content object that lacks information regarding its disposition in the collection of content nodes.

14. The method of claim 1, wherein the method further comprises the client component of the presentation player rendering, on the display device, a navigation bar outside of the content rendition area of the presentation, the navigation bar including interactive elements configured to allow a user to control the rendition of the content in the content rendition area.

15. A method using a presentation player comprising a server component and a client component, the method comprising:
   the client component of the presentation player receiving a presentation that includes a collection of content nodes;
   the client component of the presentation player receiving user interaction to navigate renditions, on an display device, of at least some of the content nodes of the presentation;
   the server component of the presentation player maintaining a historical record of the navigation of the renditions of the content nodes of the presentation;
   the server component of the presentation player receiving a service request from the presentation, the service request triggered by user interaction with a service request mechanism in a rendition of a first of the content nodes of the presentation in a content rendition area, the first content nodes node further comprising a display framework for rendering a response to the service request;
   the server component of the presentation player, in response to the service request, returning the response describing the historical record of the navigation; and
   the client component of the presentation player rendering, in accordance with the display framework, the rendition of the first content node in the content rendition area to include one or more indicia indicative of the prior navigation,
   wherein the presentation player is a set of data processing activities performed in accordance with the logic of a set of machine-readable instructions to render content for the user, the presentation player comprising the server component performed at a server data processing device and the client component performed at a client data processing device, the server component and the client component exchanging information in accordance with one or more data communication protocols.

16. The method of claim 15, wherein rendering the rendition comprises rendering a table of contents with an indicium indicating that the user had previously completed an assessment content node in the presentation.

17. The method of claim 15, wherein rendering the rendition comprises rendering a table of contents with an indicium indicating that the user had previously visited a second content node in the presentation.

18. The method of claim 15, wherein rendering the rendition comprises rendering a table of contents with an indicium indicating a currently-rendered content node in the presentation.

19. The method of claim 15, further comprising an application program interface at the client component calling a function to generate the response to the service request to generate the table of contents.

20. The method of claim 15, further comprising the presentation player returning the response to the service request to generate the table of contents to the presentation.

21. The method of claim 15, wherein receiving the service request comprises receiving consequence of user interaction with a widget in a content rendition area that includes the service request mechanism.

22. The method of claim 15, wherein the client component of the presentation player comprises an application program interface, the application program interface receiving the service request.

23. The method of claim 22, further comprising the application program interface calling a function for generating, at the server component, the response describing the historical record of the navigation through the presentation.

24. The method of claim 15, wherein:
the rendition of at least some of the content nodes of the presentation is in a content rendition area; and
the method further comprises the client component of the presentation player rendering, on the display device, a navigation bar outside of the content rendition area, the navigation bar including interactive elements configured to allow a user to control the rendition of the content in the content rendition area.

25. A presentation system for rendering a presentation for a user, comprising:
one or more output devices;
memory comprising a presentation including machine-readable descriptions of content nodes and a service request triggering mechanism to be rendered in a rendition of content in a content node within a content rendition area, the service request triggering mechanism to trigger a service request, the presentation further including extraction logic to extract relevant information from a service response to the service request, the relevant information relevant to changing the rendition of the content rendition area in which the request triggering mechanism is rendered;
a server data processing device programmed to perform a server component of a presentation player; and
a client data processing device programmed to perform a client component of the presentation player,
the server component and the client component exchanging information in accordance with one or more data communication protocols, the client component configured to generate one or more renditions of the content at the one or more output devices in the content rendition area, the server component configured to respond to the service request with the service response, the service response including at least one of information characterizing an arrangement of content in the presentation and information characterizing prior navigation of the user through the content of the presentation.

26. The presentation system of claim 25, wherein the presentation is configured to add the relevant information extracted from the response to the service request to the rendition of the content within the content rendition area.

27. The presentation system of claim 25, wherein the client component of the presentation player comprises an application program interface to receive the service request.

28. The presentation system of claim 25, wherein the server component of the presentation player is configured to respond to the service request with the service response in XML format.

29. The presentation system of claim 25, wherein the server component of the presentation player is configured to respond to the service request with the service response including information describing a hierarchical arrangement of content nodes in the presentation.

30. The presentation system of claim 25, wherein the service request triggering mechanism comprises a request widget to interact with the user and thereby receive a user selection triggering the service request.

31. The presentation system of claim 25, wherein the service request triggering mechanism comprises an automatic mechanism that is triggered without user input in response to the rendition of the content.

32. The presentation system of claim 25, wherein the presentation comprises a Shareable Content Object Reference Model presentation comprising a collection of self-contained shareable content objects.

33. The presentation system of claim 25, wherein the client component is further configured to rendering a navigation bar outside of the content rendition area, the navigation bar including interactive elements configured to allow a user to control the rendition of the content in the content rendition area.

* * * * *